United States Patent [19]

Kawashima

[11] Patent Number: 5,170,675
[45] Date of Patent: Dec. 15, 1992

[54] LINEAR MOVEMENT TABLE APPARATUS
[75] Inventor: Sosuke Kawashima, Maebashi, Japan
[73] Assignee: NSK Ltd., Tokyo, Japan
[21] Appl. No.: 736,043
[22] Filed: Jul. 25, 1991
[30] Foreign Application Priority Data Jul. 30, 1990 [JP] Japan .............................. 2-80905[U]
Jul. 30, 1990 [JP] Japan .............................. 2-80906[U]
Sep. 28, 1990 [JP] Japan ............................ 2-101924[U]

[51] Int. Cl.$^5$ ..................... F16H 29/20; F16H 27/02
[52] U.S. Cl. ............................. 74/89.15; 74/424.8 R
[58] Field of Search ............... 74/89.15, 424.8 R, 459

[56] References Cited

U.S. PATENT DOCUMENTS

| | | | |
|---|---|---|---|
| 3,858,452 | 1/1975 | Gatland et al. | 74/89.15 |
| 4,372,223 | 2/1983 | Iwatani | 74/89.15 X |
| 4,512,208 | 4/1985 | Lipinski et al. | 74/89.15 |
| 4,530,251 | 7/1985 | Henle | 74/89.15 |
| 5,074,160 | 12/1991 | Kasuga | 74/89.15 |

FOREIGN PATENT DOCUMENTS

| | | | |
|---|---|---|---|
| 3507497 | 7/1986 | Fed. Rep. of Germany | 74/89.15 |
| 2-91251 | 7/1990 | Japan . | |
| 2-304241 | 12/1990 | Japan | 74/89.15 |

Primary Examiner—Richard Lorence
Assistant Examiner—Julie Krolikowski
Attorney, Agent, or Firm—Basile and Hanlon

[57] ABSTRACT

A linear movement table apparatus includes a cylinder tube having an axially extending slit in an upper surface, a screw shaft rotatably supported in the cylinder tube, a feed nut threadedly engaged about the screw shaft, and a table body having an integrally formed piston portion and a table portion. The feed nut is loosely fitted into a nut accommodating space of a half-cylindrical piston portion with minute gaps formed in the feed direction and in the rotational direction. The piston portion has expanding portions expanding outwardly and laterally from both lateral sides. The expanding portions are respectively guided by recessed guide surfaces formed in inner side surfaces of the cylinder tube. Axially extending sliding members are respectively attached to the expanding portions of the piston portion. Each sliding member is a leaf spring made from a synthetic resin. A sliding convex portion is formed on the upper surface of the sliding member and is downwardly flexible to apply spring preload to a sliding surface of the sliding convex portion.

4 Claims, 7 Drawing Sheets

FIG. 8 *(PRIOR ART)*
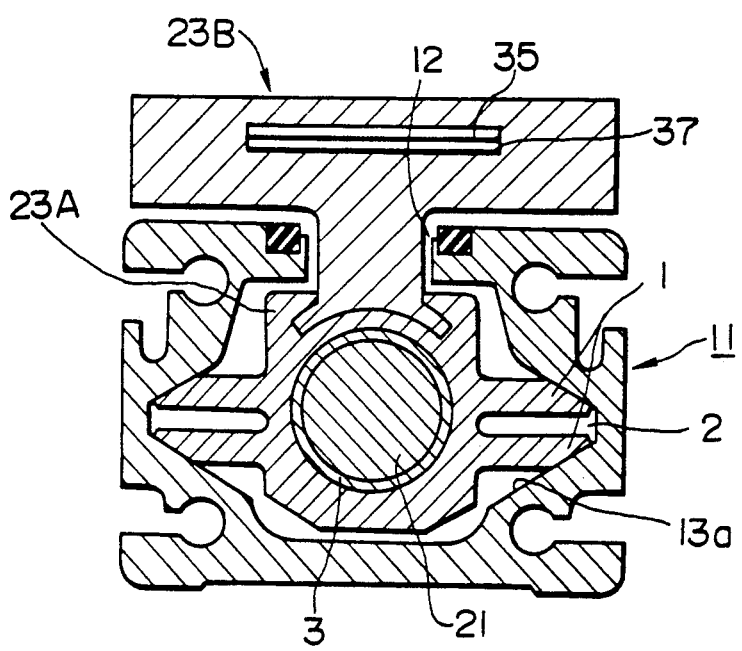

LINEAR MOVEMENT TABLE APPARATUS

BACKGROUND OF THE INVENTION

1. Field of the Invention

The present invention relates to a linear movement table apparatus in which a table body assembled to a cylinder tube so as to be slidably moved in an axial direction is linearly driven through a feed screw mechanism and, in particular, to an improvement in the sliding function, the feed function, and the dust seal function of a linear movement table apparatus.

2. Description of the Prior Art

A prior art linear movement table apparatus of the present type is shown in Japanese Utility Model Laid-Open Publication No. 2-91251 filed by the Applicant's company. This apparatus is a rodless cylinder apparatus in which a piston located inside of the cylinder is linearly driven by a slide screw mechanism. As shown in FIG. 8, a cylinder tube 11 has a slit 12 formed by cutting open an upper side of the tube 11 in an axial direction. In the inside of the cylinder tube 11, a piston portion 23A made of a synthetic resin is assembled so as to be slidably movable in the axial direction. A part of the piston portion 23A protrudes to the outside of the cylinder tube 11 through the slit 12 to form a table portion 23B. Furthermore, the piston portion 23A has a pair of expanding guide portions which protrude respectively from both lateral sides of the piston portion 23A outwardly toward groove shaped guide surfaces 13a of the cylinder tube 11. Each of the expanding guide portions 1 has a split groove 2 so that the expanding guide portion 1 is elastically deformably fitted into the guide surface 13a. Furthermore, a screw shaft 21 is inserted in an axis portion of the cylinder tube 11, with opposite ends of the screw shaft 21 being rotatably supported by the cylinder tube 11. A feed nut 3 which is integrally formed with the piston portion 23A is threadedly engaged about the screw shaft 21 to constitute a slide screw mechanism.

When the screw shaft 21 is driven into rotation in a forward direction or in a reverse direction by a driving means, not shown, the table portion 23B is moved linearly back and forth through the feed nut 3 and, in turn, through the piston portion 23A, A seal band 35 closes the slit 12 to prevent dust from intruding into the inside of the cylinder tube 11. Since the seal band 35 extends through a band inserting bore 37 which is formed in the table portion 23B and curves upwardly in the axial direction, the table portion 23B can be moved while separating the seal band 35 from an upper surface of the cylinder tube 11.

In the prior art linear movement apparatus, the split groove 2 is formed in the expanding guide portion 1 of the piston portion 23A as a slide guide mechanism so that the expanding guide portion 1 is slidably and elastically deformably in contact with the guide surface of the cylinder tube 11. However, the length of the protrusion of the expanding guide portion 1 is restricted by the size of the inner width of the cylinder tube 11 such that the expanding guide portion 1 cannot protrude to a sufficient length. As a result, a problem is encountered in that the deflection limit of the expanding guide portion 1 is small and an adjustment for a dimensional error and wear of the cylinder tube 11 is not satisfactory such that the sliding movement function is insufficient.

Regarding the feed function, it is generally known that when the slide screw mechanism employed for feeding the piston portion 23A is imparted with a lateral force or a force moment, resistance is increased significantly resulting in an increase of driving torque. However, in the prior art apparatus, since the feed nut 3 of the slide screw mechanism and the piston portion 23A are integrally formed, there is a problem in that it is necessary to finish the screw shaft 21 with a very high accuracy and without bending or a lateral deviation of the shaft. Moreover, when there is a possibility that the piston portion 23A will be subjected to an excessively large lateral force, it is necessary to form the expanding guide portion 1 to provide high rigidity so as to prevent an external force from being applied to the screw mechanism. It is also necessary to form the cylinder tube 11 so as to have a very accurate inner width size. Accordingly, it is difficult to improve the productivity of the manufacture of the apparatus.

Furthermore, as to the dust sealing function, the intrusion of dust into the inside of the cylinder tube 11 is prevented by closing the slit 12 of the cylinder tube 11 by the seal band 35. However, since the table portion 23B must be moved while lifting the seal band 35 from the upper surface of the cylinder tube 11, the seal band 35 is separated from the cylinder surface at the position of the table portion 23B and the slit 12 is open. As a result, a problem is encountered in that the intrusion of dust into the inside of the cylinder tube 11 is permitted from the lateral sides of the table portion 23B.

SUMMARY OF THE INVENTION

The present invention was made in view of the problems in the prior art and it is an object of the invention to provide a linear movement table apparatus which is compact and which is provided with a sliding movement function capable of sufficient self-adjustment with respect to the progress of wear due to sliding movement and with respect to a variation in the size of the component parts.

It is another object of the invention to provide a linear movement table apparatus which is capable of suppressing the generation of a lateral force and a force moment between a feed nut and a screw shaft, even under an adverse condition in which a cylinder tube is bent and the screw shaft is deviated and inclined due to an external force, to obtain a stable screw shaft driving torque, and which has a simple structure and is provided with a feed function.

It is still another object of the invention to provide a linear movement table apparatus which is provided with a sufficient dust seal function capable of preventing the intrusion of dust from a table portion side.

In a first aspect of the present invention, a linear movement table apparatus comprises a cylinder tube having an axially extending slit formed in an upper side, a screw shaft rotatably supported in an axial portion of the cylinder tube, and a table body including a piston portion and a table portion integrally formed with each other. The piston portion has a feed nut threadedly engaged about the screw shaft and disposed within the cylinder tube so that the piston portion is moved linearly along guide surfaces respectively formed on inner side surfaces of the cylinder tube. The table portion protrudes upwardly to an outside of the cylinder tube through the slit. Axially extending sliding members are respectively provided on lateral sides of the piston portion confronting the guide surfaces of the cylinder tube. Each of the sliding members has a sliding convex portion adapted to be slidably in contact with the guide surface of the cylinder tube and supported on the piston portion so that the sliding convex portion is flexible in a direction opposite to a protruding direction of the convex portion to thereby apply a spring preload to a sliding surface of the sliding convex portion.

In a second aspect of the invention, the feed nut is fitted into a nut accommodating space of the piston portion of the table body with minute gaps respectively in a feed direction and in a rotational direction between the feed nut and the piston portion.

In a third aspect of the invention, a seal band for closing the slit of the cylinder tube is provided. The seal band extends over an upper surface of the cylinder tube by passing the band through a bore formed in the table portion so that the band inserting through bore is curved upwardly in the axial direction. The table portion has side grooves which are axially in parallel to each other at both sides of the band inserting through bore and which are formed in a lower surface of the table portion confronting the upper surfaces of the cylinder tube. A sliding seal plate having a frame shape and a piston relief bore at a center portion is further provided. The sliding seal plate is attached to the table portion by allowing the piston portion to pass through the piston relief bore from the piston side. Inner edges of axially extending leg portions of the frame-shaped sliding seal plate are fitted into the side grooves of the table portion. Outer edges of the axially extending leg portions of the frame-shaped sliding seal plate are brought elastically into contact with the upper surfaces of the cylinder tube.

In the linear movent table apparatus described above, since the sliding member has spring properties and exhibits an elastic restoration force, a dimensional error and wear of the sliding portion are absorbed to prevent the occurrence of rattling or looseness due to gaps such that the sliding function is improved.

Since the feed nut is supported by the piston portion with gaps formed in the feeding direction and in the rotational direction, the feed nut is brought in a floating condition. As a result, even under an adverse condition wherein the cylinder tube is bent, or the screw shaft is deviated and is inclined due to an external force, no lateral force is imparted between the feed nut and the screw shaft. During movement of the feed nut, a nut end face is engaged and constrained by the table body in the feeding direction and an outer peripheral portion of the feed nut is engaged and constrained by the table body in the rotational direction. In this case, the force moment which acts on the constrained point at the end face of the feed nut is very small. Furthermore, at the constrained point at the outer peripheral portion of the feed nut, neither a lateral force or a force moment is generated other than a reaction force generated by the torque of the screw shaft. Accordingly, a stable screw shaft driving torque is obtained and the feeding function is improved.

Since the sliding seal plate is provided, the outer edge of the sliding seal plate which is attached to the lower surface of the table body to surround the outer peripheral edge of the table body is brought elastically into contact with an outer surface of the cylinder tube. This prevents dust from entering from a lower surface side of the table body. As a result, the dust seal function is improved.

BRIEF DESCRIPTION OF THE DRAWINGS

FIG. 8 is a cross sectional view of a prior art linear movement table apparatus.

DESCRIPTION OF THE PREFERRED EMBODIMENT

Figure 1:
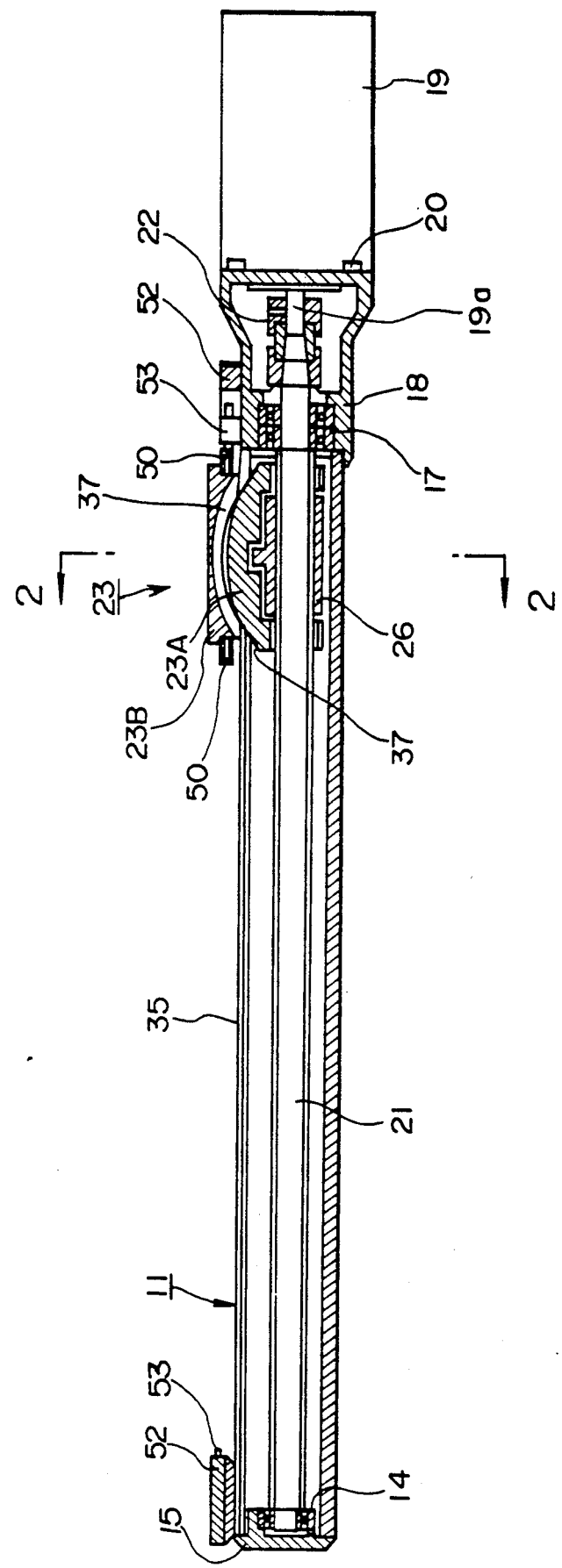
FIG. 1 is a longitudinal cross sectional view of a linear movement table apparatus of one embodiment of the present invention.

An embodiment will be described with reference to the drawings in which parts or components which are identical or equivalent to those in the prior art are designated by like reference numerals.

Figure 2:
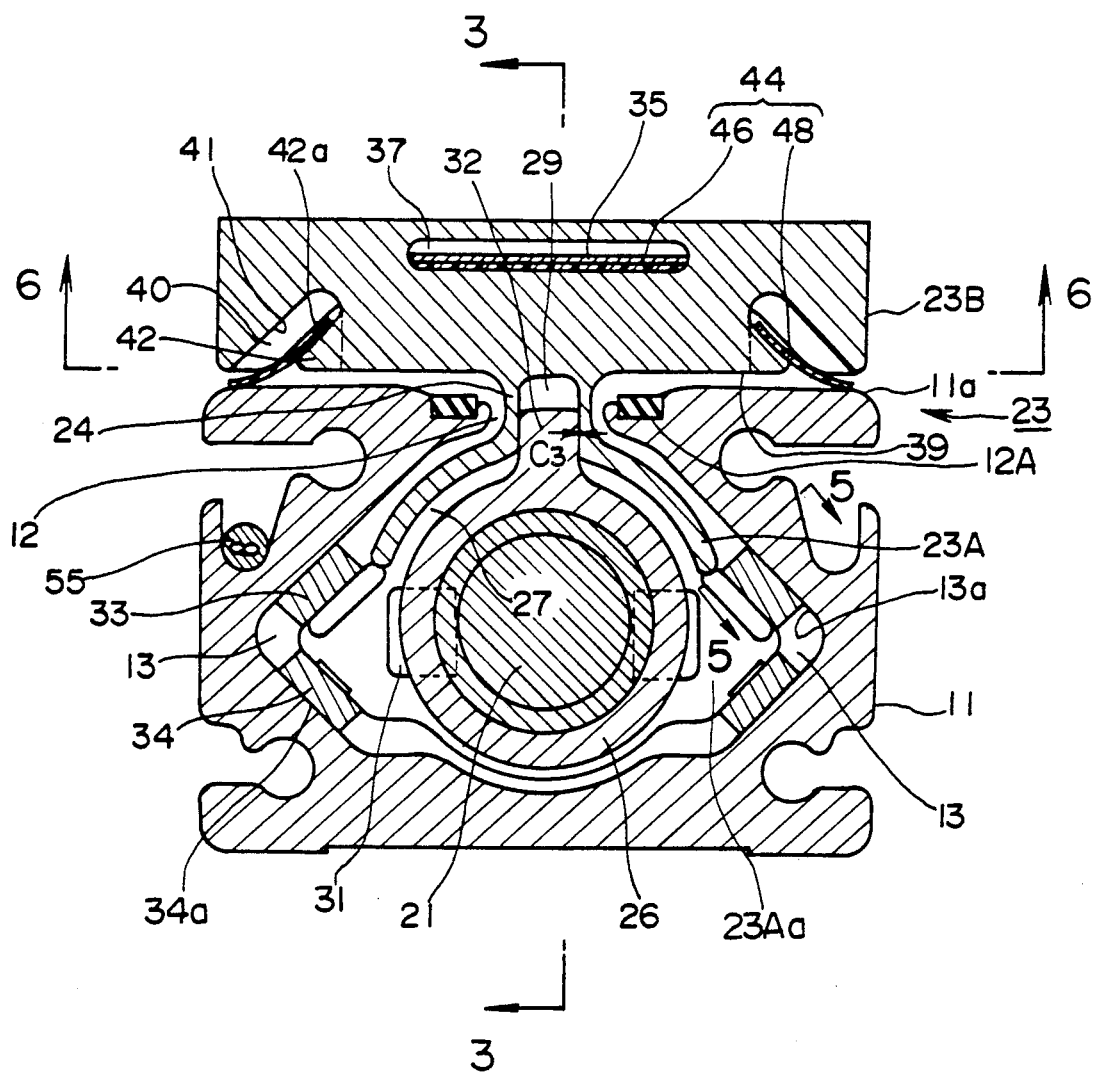
FIG. 2 is a cross sectional view generally taken along line 2—2 in FIG. 1.

As shown in FIGS. 1 and 2, a cylinder tube 11 is a hollow square-shaped product formed by drawing a light alloy. A slit 12 is formed in an upper surface of the cylinder tube 11 and extends over the whole length thereof. The cylinder tube 11 has recessed grooves 13, for example, substantially V-shaped grooves in this embodiment, formed in both inner side surfaces. The recessed grooves 12 are symmetrical and extend in an axial direction.

Figure 3:
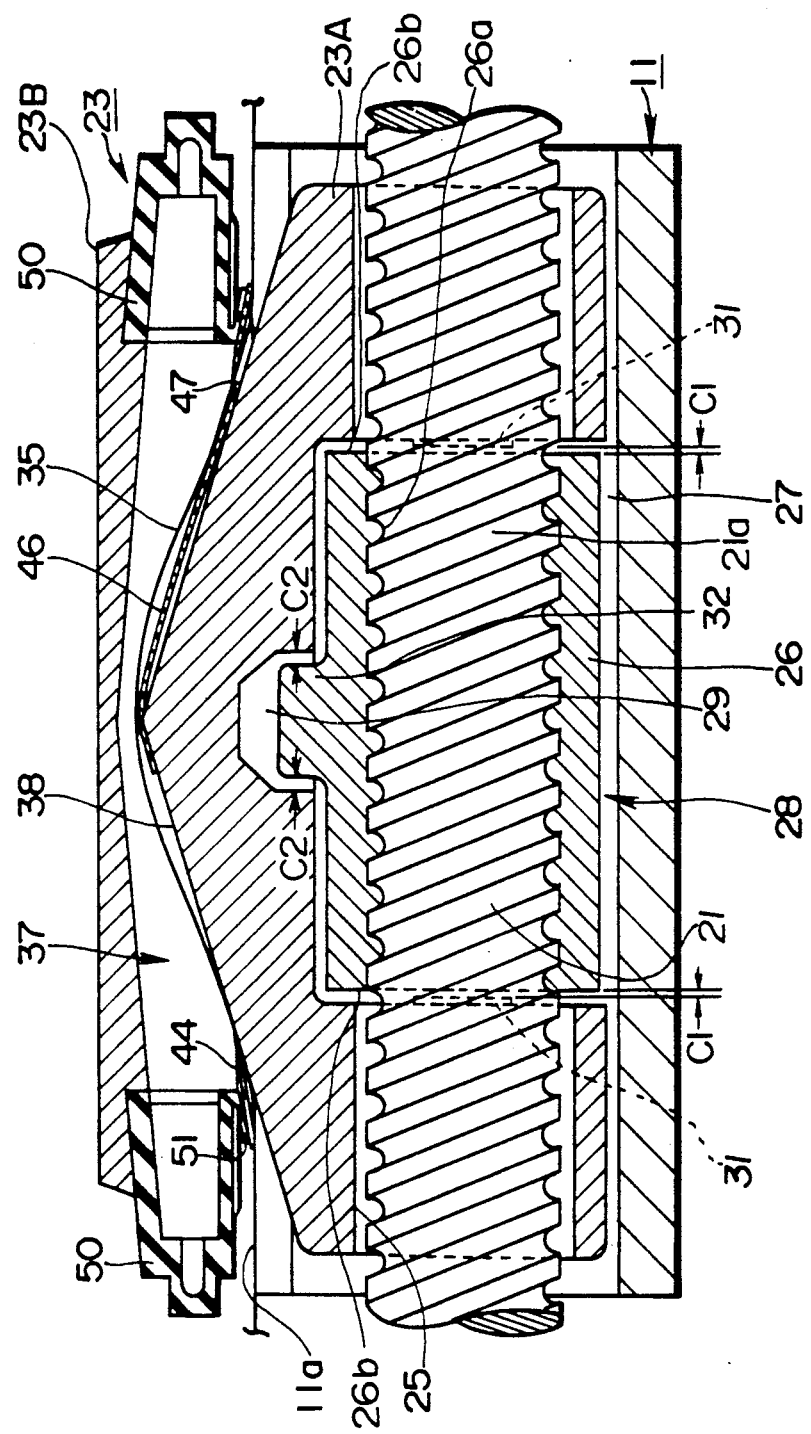
FIG. 3 is a longitudinal cross sectional view taken along line 3—3 in FIG. 2.
Figure 4:
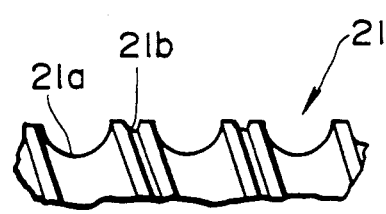
FIG. 4 is an enlarged view of a main part of the screw shaft shown in FIG. 3.

One end of the cylinder tube 11 is covered by an end cap 15 which has a bearing 14 built therein. The other end is covered by an end cap 18 which has a bearing 17 built therein. A pulse motor 19 is secured to the end cap 18 by bolts 20. An output shaft 19a of the pulse motor 19 is connected to a screw shaft (of threaded shaft) 21 by a coupling 22. The screw shaft 21 is rotatably supported in the cylinder tuber 11 through the bearings 14 and 17. The screw shaft 21, as shown in FIG. 3, includes a rolled thread having a circular arc groove 21a formed in an outer peripheral surface. A land portion of the thread has a small recessed groove 21b formed along the thread in a center of an outer surface of the land portion as shown in FIG. 4.

A table body 23 consists of a piston portion 23A and a table portion 23B which are integral with each other. The piston portion 23A is accommodated in the cylinder tube 11, with the screw shaft 21 being inserted through the piston portion 23A. The piston portion 23A has a neck portion 24 having a narrow width. The neck portions 24 unitarily connects the piston portion 23A to the table portion 23B. The neck portion 24 penetrates the slit 12 so that the table portion 23B is exposed to the outside of the cylinder tube 11.

The piston portion 23A has a substantially cylindrical shape. An inserting through bore 25 for the screw shaft 21 is formed at an axial portion to extend in an axial direction. A nut accommodating space 27 is formed at a longitudinal center portion of the inserting through bore 25 to accommodate the feed nut 26. The nut accommodating space 27 has a semi-cylindrical shape at an upper half part and a lower half part has an opening 28 which opens downwardly to a large extent. The semi-cylindrical portion of the upper half has an inner diameter somewhat larger than the outer diameter of the feed nut 26. A square groove 29 is formed in a ceiling or an inner upper surface of the semi-cylindrical portion at the center thereof. The axial length of the nut accommodating space 27 is somewhat larger than the length of the feed nut 26. Nut stopper claws 31 are respectively formed at front and rear, axial opposite ends of the nut accommodating space 27 and protrude toward the vicinity of the outer peripheral surface of the screw shaft 21. The nut stopper claws 31 respectively abut against end surfaces 26b of the feed nut 26 to constrain or restrict the feeding movement of the feed nut 26. Furthermore, the piston portion 23A has expanding portions 23Aa expanding from both lateral sides to form a V-shape at axial opposite end portions of the piston portion 23A.

On the other hand, the feed nut 26 has a rotation stopper protrusion 32 of a square shape formed on an outer peripheral surface at an axial center portion and at an upper portion as shown in FIGS. 2 and 3. The feed nut 26 is assembled into the nut accommodating space 27 from the opening 28 and the rotation stopper protrusion 32 is fitted into the square groove 29 of the nut accommodating space 27. In this case, the feed nut 26 is not integrally fixed through the nut accommodating space 27 with the piston portion 23A; but is loosely fitted with a gap therebetween. Specifically, minute feed direction gaps C1 (in this embodiment, C1 = 25 micrometers) are formed between each of the front and rear ends of the feed nut 26 and each of the nut stopper claws 31 of the piston portion 23A. In contrast to these gaps, axial direction gaps C2 between each of axial opposite inner walls of the square groove 29 and each of axial opposite ends of the rotation stopper protrusion 32 are set somewhat larger than the feed direction gap C1. Furthermore, minute rotational direction gaps C3 are formed in the rotational direction of the screw shaft 21 between each of the lateral side surfaces of the rotation stopper protrusion 32 and each of the inner wall surfaces of the square groove 29.

Figure 5:
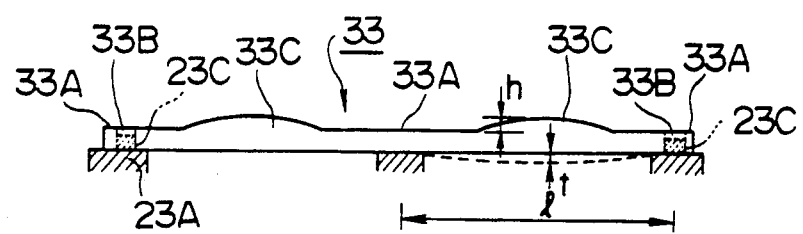
FIG. 5 is a view of the sliding member in the direction of the arrows 5—5 in FIG. 2.

Each of the V-shaped expanding portions 23Aa of the piston portion 23A has an upper sliding member 33 fixed to an upper slant surface and a lower sliding member 34 fixed to a lower slant surface. These sliding members 33 and 34 are slidably in contact with the groove surface (guide surface) 13a of the recessed groove 13 formed in the inner surface of the cylinder tube 11 to thereby constitute a sliding mechanism of a linear guide apparatus. The upper sliding member 33, as shown in FIG. 5, has a length substantially equal to the entire axial length of the piston portion 23A. The upper sliding member 33 is fixed to the piston portion 23A at three supporting positions 33A including opposite end positions and a center position. Fixing bores 33B are formed in the supporting positions 33A at the opposite end positions and displacement preventing projections 23C formed on the piston portion 23A are respectively fitted into the fixing bores 33B. A back or lower surface of the upper sliding member 33 facing the piston portion 23A is made as a flat surface. On the other hand, slidably contact convex portions 33C having a circular arc shape are formed to protrude from an upper surface of the upper sliding member 33 at two positions respectively between the adjacent supporting positions 33A. When the piston portion 23A is assembled into the cylinder tube 11, each of the slidably contact convex portions 33C is pressed against the inner wall surface 13a of the cylinder tube 11 and the upper sliding member 33 is flexed downwardly and is curved toward the back surface side. The amount of flexure t and the height h of the slidably contact convex portions 33C can be determined by experimentation. However, it is necessary that a certain margin for flexure be retained even when the degree of fitting of the piston portion 23A into the cylinder tube 11 is most loose and that a sliding frictional force does not exceed a practical limit even when the degree of the above-mentioned fitting is most severe. Furthermore, although the slidably contact convex portions 33C may be worn due to the sliding contact with the groove surface 13a of the inside of the cylinder tube 11, it is preferable to reduce the amount of wear as far as possible. To this end, it is preferable that the shape of the slidably contact convex portions 33C be made to have a large circular arc which becomes approximately a plane when the upper sliding member 33 is flexed to a maximum. In the case of this embodiment, a satisfactory operation was achieved when one span had dimensions of l=40 mm, h=0.2 mm, and t=0.1 mm.

The lower sliding member 34 has a sliding surface 34a which is slidably in contact with the inner surface of the cylinder tube 11 and which is formed as a smooth surface. The lower sliding member 34 is fixed to the piston portion 23A at opposite ends of a back surface side.

Accordingly, the slidably contact convex portions 33C of the upper sliding member 33 functions as a means for ensuring a suitable elastic contact pressure between the fitting surfaces of the cylinder tube 11 and the piston portion 23A and it automatically absorbs an excessively large fitting margin due to a dimensional error and the like and, at the same time, compensates for a decrease of the fitting margin due to wear and the like to thereby prevent generation of a rattle.

The table portion 23B of the table body 23 has a band inserting through bore 37 for a seal band 35 formed in and penetrating the table portion 23B in the axial direction. A bottom surface of the band inserting through bore 37 is slowly curved upwardly to form a band guide surface 38. The band inserting through bore 37 opens to a lower surface 39 of the table portion 23B at axial opposite ends of the lower surface 39 as shown in FIG. 3.

Figure 6:
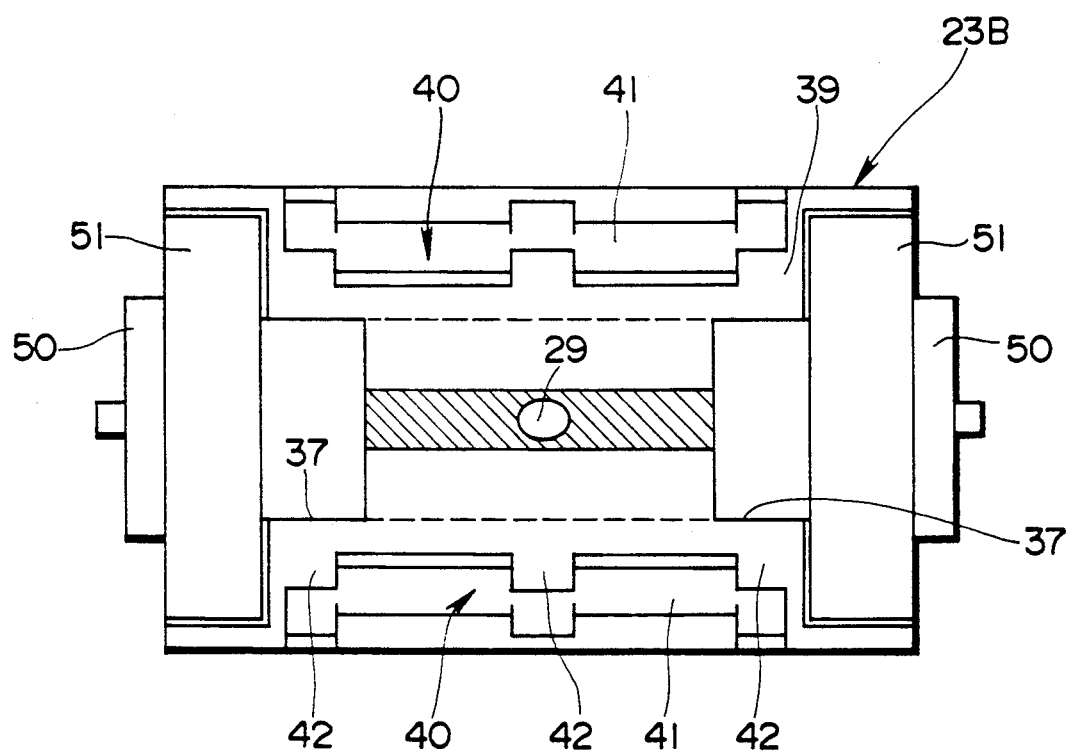
FIG. 6 is a view of the table portion in the direction of arrows 6—6 in FIG. 2.

The table portion 23B further has side grooves 40 formed in the lower surface 39 as shown in FIGS. 2 and 6. The side grooves 40 are in parallel to each other in the axial direction and are located at both sides of the band inserting through bore 37. Openings of the side grooves 40 confront the upper surface 11a of the cylinder tube 11. One of the inner walls of each side groove 40 has a slant surface 41 which is inclined downwardly and outwardly from a bottom of the side groove 40 toward the upper surface 11a and the other inner wall is perpendicular to the upper surface 11a. Guide projections 42 are formed in the other inner wall of the side groove 40 at opposite ends and a center position of the side groove 40. A surface of each guide projection 42 facing the slant surface of the one inner wall of the side groove 40 constitutes a guide slant surface 42a.

Figure 7A:
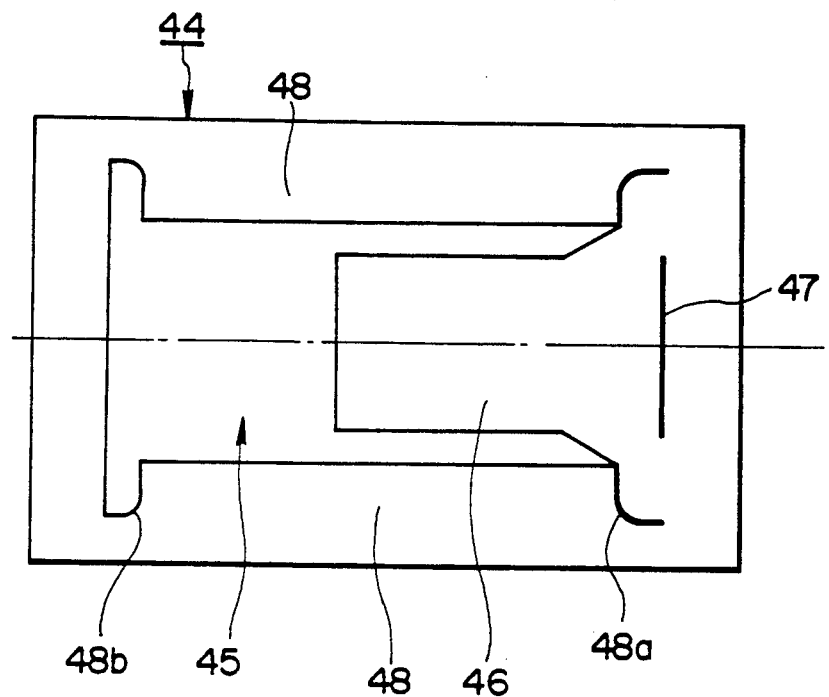
FIG. 7(a) is a plan view of the sliding seal plate.
Figure 7B:
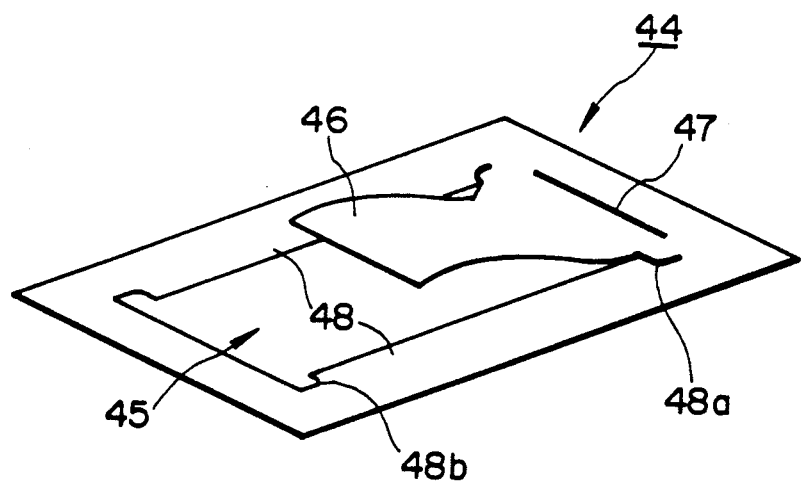
FIG. 7(b) is a perspective view of the sliding seal plate.

A slide seal plate 44 is attached to the lower surface 39 of the table portion 23A by utilizing the side grooves 40. The sliding seal plate 44 is an elastic sheet of a synthetic resin formed by mixing an antifriction material. As shown in FIGS. 7a and 7b, the sliding seal plate 44 is of a rectangular frame shape having a relief aperture 45 for the piston portion 23A at a center thereof. The sliding seal plate 44 is an edging along an outer edge of the lower surface 39 of the table portion 23A. A tongue portion 46 is formed at one laterally-extending leg portion of the frame-shaped sliding seal plate 44 and protrudes into the relief aperture 45. A cut 47 is formed at a base of the tongue portion 46 to allow the seal band 35 to be inserted therethrough. Furthermore, cuts 48a and 48b are formed in base portions of each of axially extending leg portions or side edges of the frame-shaped sliding seal plate 44 to form an elastic attaching portion 48 so that an inner edge of the elastic attaching portion 48 can be bent upwardly. The sliding seal plate 44 is made to abut against the lower surface 39 of the table portion 23B by inserting the piston portion 23A through the relief aperture 45 and inserting the tongue portion 46 into the band inserting bore 37. At the same time, both of the elastic attaching portions 48 are respectively fitted into the side grooves 40 to provide bending elasticity.

After the table body 23 is assembled to the cylinder tube 11, the opening of the slit 12 in the upper surface of the cylinder tube 11 is covered by the seal band 35 which is made of a thin steel sheet. As shown in FIG. 2, rubber magnets 12A of a strip shape are attached to side edges of the opening of the slit 12. The seal band 35 is attracted by a magnetic force of the rubber magnets 12A to improve sealing properties. Terminating ends of the seal band 35 are fixed respectively to the end caps 15 and 18. Furthermore, an intermediate portion of the seal band 35 is inserted through the band inserting bore 37. In inserting the seal band 35, one end of the seal band 35 is inserted into the cut 47 from a lower side of the slide seal plate 44 and made to pass over the tongue portion 46 and to pass through the relief aperture 45 to reach a lower side of the slide seal plate 44 as shown in FIG. 3.

Buffer members 50 made of rubber are respectively fitted into opposite ends of the band inserting bore 37. An elastic lip 51 is integrally provided on a lower surface of each of the buffer members 50 integrally therewith. Thus, the elastic lips 51 elastically press the front and rear edges of the sliding seal plate 44 downwardly.

Stopper members 52 for restricting the stroke ends of the table body 23 are respectively attached to upper surfaces of the longitudinal opposite ends of the cylinder tube 11 so that the axial positions of the stopper members 52 are adjustable. Furthermore, a part of each stopper member 52 is cut out and a limit switch 53, FIG. 1, acting as a position detector is attached to the stopper member 52. In this case, the wiring 55, FIG. 2, of the limit switch 53 which is positioned at a leading end of the cylinder tube 11 is accommodated in a groove formed in an outer side surface of the cylinder tube 11 so that the wiring 55 does not disturb the movement of the table body 23.

The operation of the linear movement table apparatus will now be described.

As shown in FIGS. 1 and 3, it is assumed that the feed nut 26 is positioned at the center of the nut accommodating space 27 of the table portion 23B, When the pulse motor 19 is driven into rotation in a forward direction, the screw shaft 21 is rotated. The feed nut 26 which is threadedly engaged about the screw shaft 21 is, if a gap is present in the rotational direction between the square groove 29 and the rotation stopper protrusion 32, rotated in the same direction as the screw shaft 21 such that the gap becomes zero. After the rotation stopper protrusion 32 is held by the piston portion 23A, the rotation of the feed nut 26 is interrupted. Accordingly, when the thread of the screw shaft 21 has a right-handed screw and is rotated in the right hand direction, the feed nut 26 begins to move to the right in FIG. 1. In this embodiment, when the feed nut 26 is moved in an axial direction by about 25 micrometers, the right-hand gap C1 in the feeding direction becomes zero and the end surface 26b of the feed nut 26 is held by the left-hand nut stopper claw 31 of the piston portion 23A. Thereafter, the table portion 23B is pushed by the feed nut 26 and is moved in the right-hand direction while being guided by the cylinder tube 11. When the rotation of the pulse motor 19 is reversed, although the direction is different, the operation is similar, and the table portion 23B is moved in a left-hand direction by being guided by the cylinder tube 11. In this manner, by rotation the pulse motor 19 in the forward or reverse direction, the table body 23 is moved in an axial direction through the rotation of the screw shaft 21 Thus, a driven-member mounted on the table body 23 can be moved at will in the axial direction of the linear movement table apparatus and can be exactly stopped at a desired position.

The movement of the piston portion 23A can be accurately achieved by controlling the pulse motor 19. However, if the piston portion 23A should overrun, it is restricted by the stopper members 52. The positions of the stopper members 52 can be changed at will in the axial direction by being guided by the outer surface of the cylinder tube 11. Furthermore, the overrun of the piston portion 23A can be prevented without fail by stopping the pulse motor 19 via the limit switch 53.

Supposing that, as in a general linear movement table apparatus, the table body 23 and the feed nut 26 are securely connected to each other as a unit. When the guide surface 13a of the cylinder tube 11 is bent, the screw shaft 21 is deviated, or the table body 23 is displaced due to an external force, a lateral force and a force moment will be imparted between the screw shaft 21 and the feed nut 26 during driving of the screw shaft 21. However, in this embodiment, the table body 23 holds the feed nut 26 through the gaps C1, C2, and C3. As a result, even when the guide surface 13a of the cylinder tube 11 is bent, the screw shaft 21 is deviated, or the table body 23 is displaced due to an external force, no lateral force acts between the screw shaft 21 and the feed nut 26.

Furthermore, the feed nut 26 is constrained in the feeding direction by the nut stopper claw 31 at a position near an effective diameter of the female thread at the nut end surface 26b. Accordingly, the moment generated at the constrained point due to a thrust force acting on the feed nut 26 is very small.

Furthermore, since the constraint of the feed nut 26 in the rotational direction is effected against the rotation stopper protrusion 32 formed on the outer peripheral surface of the feed nut 26 by the inner wall surface of the square groove 29 accommodating the protrusion 32 with the gap C3, neither a lateral force nor a force of moment is generated; other than a reaction force generated due to the torque of the screw shaft 21. Since the screw shaft 21 has a thread groove 21a of a circular arc shape, non-uniform thrust is prevented. Moreover, since the groove 21b is formed in the land of the thread, the groove 21b serves as a grease reservoir and the lubrication by grease is stable resulting in a long service life.

When the degree of fitting of the piston portion 23A into the cylinder tube 11 is too tight, the resistance to movement will be excessively large. Conversely, if it is too loose, a rattling will be caused during movement of the piston portion 23A. In this embodiment, the upper and lower sliding members 33 and 34, which constitute the sliding mechanism, realize a smooth fitting between the cylinder tube 11 and the piston portion 23A. In particular, the upper sliding member 33 which has a sufficient length in the axial direction functions as a leaf spring. Specifically, the sliding contact convex portion 33C of the upper sliding member 33 provides an adequate elastic pressure (spring preload) between the fitting surfaces of the cylinder tube 11 and the piston portion 23A. As a result, an excessively large margin for fitting due to a dimensional error is automatically absorbed and, at the same time, a decrease in the fitting margin due to wear is compensated for. Thus, the generation of a rattling or looseness is prevented. In this embodiment, when the table body 23 reciprocatingly moves in an axial direction, the looseness is about 50 micrometers at a maximum which is in a range which does not cause a problem in usual applications (for example, a robot operation).

As described above, since the upper sliding member 33 acts as a leaf spring utilizing the flexure of a beam, it is possible to make the upper sliding member 33 compact. Furthermore, by forming the upper sliding member 33 from a synthetic resin, it can be injection molded and it is possible to accurately determine a height under a free condition and a limit amount of flexure. Thus, a stable preload can be obtained.

When an excessively large external force is applied to the piston portion 23A, the sliding contact convex portion 33C of the upper sliding member 33 is deflexed and the external force is received by the supporting portions 33A. Accordingly, an allowable external force is determined depending on the strength against compression of the upper sliding member 33 and the upper sliding member 33 can never break due to an insufficient bending strength which is smaller than the compressive strength.

During movement of the table body 23, the table body 23 pushes the seal band 35 upwardly which closes the opening of the slit 12 by the circular arc surface of the band guide surface 38 to prevent the intrusion of dust. A crest portion of the circular arc surface of the band guide surface 38 is covered by the tongue portion 46 of the sliding seal plate 44 and has small frictional resistance and wear resistant properties. As a result, the friction of the crest portion of the band guide surface 38 with respect to the seal band 35 is reduced and the wear of this portion of the table body 23 is reduced such that the required driving force can also be reduced.

The seal band 35 is depressed against the upper surface of the cylinder tube 11 at the front and rear ends of the table portion 23B by the elastic lips 51 at the lower surface of the buffer members 50 through the sliding seal plate 44. Furthermore, the lateral outer edges of the axially extending leg portions of the frame-shaped sliding seal plate 44 are pressed to contact the upper surface 11a of the cylinder tube 11 under pressure by bending elastic forces of the elastic attaching portions 48 of the side edges of the sliding seal plate 44 fitted into the side grooves 40 of the table portion 23B. Accordingly, the gap between the lower surface side of the table portion 23B and the upper surface 11a of the cylinder tube 11 is completely sealed over its whole periphery by the sliding seal plate 44. Thus, as compared with the prior art apparatus, dust cannot intrude into the inside of the cylinder tube 11 from lateral sides of the table portion 23B. Furthermore, the outer edges of the laterally-extending leg portions of the sliding seal plate 44 are closely in contact with an upper surface of the seal band 35 such that dust on the seal band 35 is scraped out. Thus, the laterally-extending leg portions of the sliding seal plate 44 act as a scraper.

While the above embodiment is described for a linear movement table apparatus provided with the slide screw mechanism, that is, as to a rodless cylinder, the coupling structure between the feed nut 26 and the piston portion 23A with the gaps interposed therebetween is also applicable to other slide screw mechanisms.

Furthermore, the sliding mechanism using the sliding members having the sliding contact convex portion 33C which is supported so as to be flexible in the opposite direction or in the back side direction to thereby apply a spring preload to the sliding contact surface is of course applicable not only to a rodless cylinder but also to other linear slide guide apparatus.

Moreover, the dust seal mechanism using the sliding seal plate 44 in the present invention is applicable not only to a rodless cylinder but also to an air pressure driving type and other linear movement table apparatus.

As described in the foregoing, the present invention provides the following advantageous effects.

In the first aspect of the invention, the sliding member having a sufficiently long length in the axial direction is provided at the sliding contact surface between the piston portion and the cylinder tube. A spring preload is applied to the sliding contact surface by elastically (spring) deforming the sliding member itself. By virtue of this arrangement, wear of the sliding member and the dimensional error of the sliding portion are automatically absorbed by the spring elasticity such that no gap is caused therebetween. As a result, looseness of the sliding contact surface or the generation of the rattling is prevented and the guiding accuracy is improved. Furthermore, the sliding member can be made by injection molding and a free height and a limit flexure margin can be accurately determined. As a result, it is possible to provide at low cost a linear movement table apparatus which has sufficient automatic adjusting capability for dimensional error and wear and which has a sliding function capable of applying a stable preload.

In the second aspect of the invention, the feed nut of the linear movement table apparatus which is threadedly engaged with the slide screw shaft is loosely fitted with minute gaps respectively in the axial direction and in the rotational direction into a nut accommodating space of the table body. As a result, any bending of the cylinder tube, deviation of the screw shaft and inclination due to an external force are easily absorbed and the generation of a lateral force and a force moment between the feed nut and the screw shaft can be suppressed. Thus, a stable driving torque for the screw shaft can be obtained without requiring the fabrication of the feed nut and the screw shaft with high accuracy and with high rigidity. The rigidity of the feed nut in the rotational direction is not reduced and the after-working of the feed nut is not necessary. Accordingly, it is possible to provide a linear movement table apparatus which is high in productivity and which is provided with a feeding function of the simple structure.

In the third aspect of the invention, the table body has side grooves formed in the lower surface confronting the upper surface of the cylinder tube so that the side grooves are positioned at both sides of the seal band inserting through bore in parallel with each other. The frame-shaped sliding seal plate having a relief bore for the piston portion at the center is attached to the lower surface of the table portion so as to surround the lower surface. The inner edges of the axially extending leg portions of the frame-shaped sliding seal plate are respectively fitted into the side grooves to thereby provide bending elasticity to the inner edges of the axially extending leg portions. Thus, the outer edges of the axially extending leg portions of the frame-shaped sliding seal plate are elastically in contact with the upper surface of the cylinder tube to constitute a dust seal mechanism. Accordingly, it is possible to provide a linear movement table apparatus having a dust seal function capable of sufficiently and effectively preventing the intrusion of dust from the gap at the lower side of the table portion of the table body.

What is claimed is:

1. A linear movement table apparatus comprising:
   a cylinder tube having an axially extending slit formed in an upper side;
   a screw shaft rotatably supported in an axial portion of the cylinder tube;
   a feed nut threadedly engaged about the screw shaft;
   a table body including a piston portion and a table portion formed integrally with each other, the piston portion being associated with the feed nut and disposed within the cylinder tube so that the piston portion is moved linearly along guide surfaces respectively formed on inner side surfaces of the cylinder tube, the table portion protruding to an outside of the cylinder tube through the slit;
   the feed nut fitted into a nut accommodating space of the piston portion of the table body with minute gaps respectively formed in a feed direction and in a rotational direction between the feed nut and the piston portion; and
   axially extending sliding members respectively provided on lateral sides of the piston portion and confronting the guide surfaces of the cylinder tube, the sliding members being adapted to be slidably in contact with the guide surface of the cylinder tube and supported on the piston portion so that the sliding members are flexible in a direction opposite to a protruding direction of the sliding members to thereby apply a spring preload to the sliding surfaces of the sliding members.

2. A linear movement table apparatus comprising:
   a cylinder tube having an axially extending slit formed in an upper side;
   a screw shaft rotatably supported in an axial portion of the cylinder tube;
   a feed nut threadedly engaged about the screw shaft;
   a table body including a piston portion and a table portion formed integrally with each other, the piston portion being associated with the feed nut and disposed within the cylinder tube so that the piston portion is moved linearly along guide surfaces respectively formed on inner side surfaces of the cylinder tube, the table portion protruding to an outside of the cylinder tube through the slit;
   the feed nut fitted into a nut accommodating space of the piston portion of the table body with minute gaps respectively formed in a feed direction and in a rotational direction between the feed nut and the piston portion; and
   axially extending sliding members respectively provided on lateral sides of the piston portion and confronting the guide surfaces of the cylinder tube, each of the sliding members having a sliding convex portion adapted to be slidably in contact with the guide surface of the cylinder tube and supported on the piston portion so that the sliding convex portion is flexible in a direction opposite to a protruding direction of the sliding convex portion to thereby apply a spring preload to a sliding surface of the sliding convex portion.

3. A linear movement table apparatus comprising:
   a cylinder tube having an axially extending slit formed in an upper side;
   a screw shaft rotatably supported in an axial portion of the cylinder tube;
   a feed nut threadedly engaged about the screw shaft;
   a table body including a piston portion and a table portion formed integrally with each other, the piston portion being associated with the feed nut and disposed within the cylinder tube so that the piston portion is moved linearly along guide surfaces respectively formed on inner side surfaces of the cylinder tube, the table portion protruding to an outside of the cylinder tube through the slit;
   the table portion having a band inserting through bore penetrating in an axial direction therethrough, a bottom surface of the band inserting through bore curving upwardly along the axial direction, the table portion having side grooves which are axially in parallel to each other at both sides of the band inserting through bore and which are formed in a lower surface of the table portion confronting an upper surface of the cylinder tube;
   axially extending sliding members respectively provided on lateral sides of the piston portion and confronting the guide surfaces of the cylinder tube, each of the sliding members having a sliding convex portion adapted to be slidably in contact with the guide surface of the cylinder tube and supported on the piston portion so that the sliding convex portion is flexible in a direction opposite to a protruding direction of the sliding convex portion to thereby apply a spring preload to a sliding surface of the sliding convex portion;
   a seal band for closing the slit of the cylinder tube, the seal band extending over an upper surface of the cylinder tube by passing through the band inserting through bore; and
   a sliding seal plate having a frame shape and a piston relief bore at a center portion, the sliding seal plate being attached to the table portion by allowing the piston portion to pass through the piston relief bore from the piston portion side, inner edges of axially extending leg portions of the sliding seal plate being fitted into the side grooves of the table portion, outer edges of the axially extending leg portions of the sliding seal plate being brought elastically into contact with the upper surface of the cylinder tube.

4. The linear movement table apparatus according to claim 2 wherein the table portion has a band inserting through bore penetrating in an axial direction therethrough, a bottom surface of the band inserting through bore curving upwardly along the axial direction, the table portion having side grooves which are axially in parallel to each other at both sides of the band inserting through bore and which are formed in a lower surface of the table portion confronting an upper surface of the cylinder tube;

the linear movement table apparatus further comprising:
a seal band for closing the slit of the cylinder tube, the seal band extending over an upper surface of the cylinder tube by passing through the band inserting through bore; and
a sliding seal plate having a frame shape and a piston relief bore at a center portion, the sliding seal plate being attached to the table portion by allowing the piston portion to pass through the piston relief bore from the piston portion side, inner edges of axially extending leg portions of the sliding seal plate being fitted into the side grooves of the table portion, outer edges of the axially extending leg portions of the sliding seal plate being brought elastically into contact with the upper surface of the cylinder tube.

* * * * *